(12) United States Patent
Soukup

(10) Patent No.: US 7,492,111 B2
(45) Date of Patent: Feb. 17, 2009

(54) METHOD OF CONTROLLING TWO OR MORE COMMUTATOR DC PERMANENT MAGNET MOTORS IN DRIVING MECHANISMS FOR SETTING A POSITION OF FURNITURE PARTS AND A DEVICE FOR CARRYING OUT THE METHOD

(75) Inventor: Miroslav Soukup, Vrchlabi (CZ)

(73) Assignees: Linet Spol.S.R.O. (CZ); E.C. Sys S.R.O. (CZ)

( * ) Notice: Subject to any disclaimer, the term of this patent is extended or adjusted under 35 U.S.C. 154(b) by 12 days.

(21) Appl. No.: 11/568,471

(22) PCT Filed: Apr. 27, 2005

(86) PCT No.: PCT/CZ2005/000035

§ 371 (c)(1),
(2), (4) Date: Oct. 30, 2006

(87) PCT Pub. No.: WO2005/107055

PCT Pub. Date: Nov. 10, 2005

(65) Prior Publication Data

US 2007/0252539 A1 Nov. 1, 2007

(30) Foreign Application Priority Data

Apr. 30, 2004 (CZ) .................. PUV2004-15379

(51) Int. Cl.
*H02P 5/50* (2006.01)

(52) U.S. Cl. .................. 318/77; 318/104; 318/626

(58) Field of Classification Search ........... 318/599, 318/626, 38, 66–77, 80, 101–104
See application file for complete search history.

(56) References Cited

U.S. PATENT DOCUMENTS 4,733,144 A    3/1988    Bisseling (Continued)

FOREIGN PATENT DOCUMENTS

| FR | 2 699 019 A | 6/1994 |
|----|----|----|
| GB | 2 024 464 A | 1/1980 |
| JP | 60 082085 A | 5/1985 |

OTHER PUBLICATIONS

Patent Abstract of Japan vol. 0009, No. 225 (E-342) Sep. 11, 1985.

*Primary Examiner*—Bentsu Ro
(74) *Attorney, Agent, or Firm*—Ostrolenk, Faber, Gerb & Soffen, LLP

(57) ABSTRACT

The invention relates to a method of controlling two or more commutator DC motors with permanent magnets in driving mechanisms for setting a position of furniture parts such as tables, beds, chairs etc., where particular driving mechanisms must maintain mutually defined speed independently on their different load. The invention consists in that during functioning of the motors is periodically disconnected power supply of the motors, while in the time of disconnecting the supply is detected the voltage of each motor, which is adjusted using calibration constant characteristic for each motor and the direction of rotation and according to the differences of such adjusted voltages of particular motors is adjusted the operating mode of each motor, by means of which is reached an effective regulation of particular motor run to mutually defined speed independently on their load. The invention also relates to a device for controlling two or more commutator DC motors with permanent magnets in driving mechanisms for setting a position of furniture parts such as tables, beds, chairs etc., where particular driving mechanisms must maintain mutually defined speed independently on their different load. The device consists of at least one power supply, with which are through power management blocks of particular motors coupled at least two motors, while with each motor is by its first input coupled a multiplier, where with its second input is coupled a calibration constant block, while the outputs of the multipliers are connected to the inputs of the first comparison element, whose outputs are connected to the inputs of a regulator, whose outputs are connected to the inputs of the power management blocks of particular motors, while on the second input of the regulator is by its output connected a timer clock.

8 Claims, 2 Drawing Sheets

U.S. PATENT DOCUMENTS

| | | | |
|---|---|---|---|
| 5,469,936 A * | 11/1995 | Lauga et al. | 187/205 |
| 5,713,832 A * | 2/1998 | Jain | 601/49 |
| 6,690,132 B2 * | 2/2004 | Koch | 318/445 |
| 6,841,953 B2 * | 1/2005 | Bastholm | 318/7 |
| 2003/0038605 A1 * | 2/2003 | Koch | 318/445 |
| 2003/0052626 A1 * | 3/2003 | Wehmeyer et al. | 318/85 |
| 2003/0117094 A1 | 6/2003 | Bastholm | |
| 2008/0012516 A1 * | 1/2008 | Ctvrtnicek | 318/490 |

\* cited by examiner

METHOD OF CONTROLLING TWO OR MORE COMMUTATOR DC PERMANENT MAGNET MOTORS IN DRIVING MECHANISMS FOR SETTING A POSITION OF FURNITURE PARTS AND A DEVICE FOR CARRYING OUT THE METHOD

CROSS REFERENCE TO RELATED APPLICATION

The present application is a 35 U.S.C. §§ 371 national phase conversion of PCT/CZ2005/000035, filed 27 Apr. 2005, which claims priority of Czech Republic Patent Application No. PUV2004-15379, filed 30 Apr. 2004. The PCT International Application was published in the English language.

1. Technical Field

The invention relates to a method of controlling two or more commutator DC motors with permanent magnets in driving mechanisms for setting a position of furniture parts such as tables, beds, chairs etc., where particular driving mechanisms must maintain mutually defined speed independently on their different load.

The invention also relates to a device of controlling two or more commutator DC motors with permanent magnets in driving mechanisms for setting a position of furniture parts such as tables, beds, chairs etc., where particular driving mechanisms must maintain mutually defined speed independently on their different load.

2. Background Art

The positioning of beds, tables and chairs is as a rule performed by means of various types of linear driving mechanisms, which are driven by DC reversible motors with permanent magnets. For vertical setting is as a rule used two or more independent linear driving mechanisms and this way is implemented an easy positioning not only vertical but also arbitrary tilting. This is for instance in a lifting mechanism according to PV 768-97. The lift of the operating table is according to this document performed by a parallel run of two linear driving mechanisms, tilting along the transverse axis of the table is performed by their mutually opposite run and tilting along the longitudinal axis is performed by the third linear driving mechanism. The use of independent linear driving mechanisms is popular because increases the positioning possibilities, simplifies the construction and enables reduced price of the final product.

However, simple driving mechanisms exhibit one serious problem. The problem is a different movement speed at the same driving voltage and speed dependence on the load. Used DC motors have manufacturing no-load rotation fluctuation as a rule higher than +/−10% and they differ also according to the rotation direction. These drawbacks fully show up e.g. in need to lift the table or the load surface of the bed or chair and not to change the original plane or the original slope. The mentioned operation is performed by two or more linear motors and their various speeds cause the change in the plane and the result is that the bed, table or chair is tilting towards the slowest driving mechanism.

More expensive embodiments of the linear driving mechanisms thus have built-in relative or absolute position sensors, which enable to regulate the motion of the driving mechanisms to the same speed or also to the absolute position. Most frequently as relative sensors are used Hall sensors, various inductive sensors and optosensors, as absolute sensors then e.g. multispeed spiral potentiometers.

Another solution, namely digital PI synchronizer of two DC motors is mentioned in U.S. Pat. No. 4,733,144. Proportional-plus-integral unit according to this solution continuously evaluates the actual speed of the motors and the observed values integrated in the required time period sends as a digital output into the logic circuit, where they are compared with the set reference value. On basis of observed differences are the rotations of both motors continuously controlled so they are consistent with the set value. The reference values and operating instructions are entered using a controller. This synchronizer is appropriate for instance in copying machines and such devices, where does not occur any distinct differences in power loading of particular motors.

Due to the price are today mass-produced and used linear driving mechanisms without sensors with all their negative properties, which are then translated onto the final product. The consequence is the need of manual balancing the position using e.g. built-in level or lowering to the bottom position or lifting to the top position and thus overall leveling up.

The outlined problem of using cheap driving mechanisms can be partially solved by choosing the driving mechanisms with similar speeds, independent system of measuring the positioned device or using the device according to WO 02/03526 A2 (EP 1.314.234 A2). This device is designate for cheap control systems without microprocessor control unit with relatively complicated circuit using so called "pseudo-motor" and supplementing the comparison of dominant frequencies included in commutator currents of particular motors.

The goal of the invention is to develop a reliable and in so doing simple and reasonably priced system for controlling two or more commutator DC permanent magnet motors in driving mechanisms for setting the position of furniture parts.

PRINCIPLES OF THE INVENTION

The goal of the invention has been reached by a method of controlling two or more commutator DC motors with permanent magnets in driving mechanisms for setting a position of furniture parts such as tables, beds, chairs etc., whose principle consists in that, during functioning of the motors is periodically disconnected power supply of the motors, while in the time of disconnecting the supply is detected the voltage of each motor, which is adjusted using calibration constant characteristic for each motor and the direction of rotation and according to the differences of such adjusted voltages of particular motors is adjusted the operating mode of each motor, by means of which is reached an effective regulation of particular motor run to mutually defined speed independently on their load.

The advantage of this solution consists in that it enables also the use of the cheapest driving mechanisms and it does not need any members sensoring their rotation speed or position. The solution is a little dependent on the motor rotation fluctuation, different rotations left/right, motors from different manufacturers and also motors with a different number of poles. The limitation of the motors' speed by about 1-2% due to periodical motor supply sampling is insignificant compared to usual speed fluctuations due to fluctuations of main voltage by +/−10% and fluctuations due to loading the power supply of up to −40%. Another advantage of this solution is that the driving mechanisms speed is approximately the same and it can be controlled by the speed of the slowest driving mechanism. Thus it is possible to set up the speed of the slowest driving mechanism to the maximum at the given supply voltage. Another advantage of the solution is also that at slowing down only one driving mechanism by uneven load of all driving mechanisms, the other driving mechanisms adjust to the speed of the slowest driving mechanism. Another advantage of the solution is that all components except for power supply and electronic power switches in the power management blocks of particular motors can be effectively put into practice, e.g. in already existing microprocessor systems for controlling driving mechanisms for setting the position of the furniture parts. Also electronic power switches are as a rule present in already existing positioning control systems. By means of this are radically lowered costs on application of this technical solution in already existing systems and the solution is advantageous also for the cheapest positioning control systems. Another advantage of this solution is that by means of an auxiliary reference voltage block can be the entire control of commutator DC permanent magnet motors easily changed from the maximal-speed control according to the slowest driving mechanism to a defined-speed control given by the magnitude of the reference voltage. The advantage of the mentioned solution is also that it can be used generally not only for the constant-speed control but also by a mere change of the calibration constant for a defined speed ratio control and thus create more general positioning functions.

To improve the regulation is the voltage of each of the motors after disconnecting the power supply detected after the transient response on the motors' inductance goes off.

For next extension of the possibilities of regulation is advantageous if the operation mode of one of the motors is adjusted by means of a reference voltage and according to its operation mode is then determined the operation mode of the other motors.

The principle of the device for controlling two or more commutator DC motors with permanent magnets in driving mechanisms for setting a position of furniture parts such as tables, beds, chairs etc., consists in that it consists of at least one power supply, with which are through power management blocks of particular motors coupled at least two motors, while with each motor is by its first input coupled a multiplier, where with its second input is coupled a calibration constant block, while the outputs of the multipliers are connected to the inputs of the first comparison element, whose outputs are connected to the inputs of a regulator, whose outputs are connected to the inputs of the power management blocks of particular motors, while on the second input of the regulator is by its output connected a timer clock.

For better timing of the device functioning is advantageous if the timer clock is by its outputs further connected to the inputs of power management blocks of particular motors and to the inputs of the multipliers.

To improve control possibilities of the device is advantageous if on the regulator input is by its output connected the second comparison element on whose inputs are connected the reference voltage block output and an output of one of the multipliers.

DESCRIPTION OF THE DRAWING

The invention is schematically shown in drawings, where.

SPECIFIC DESCRIPTION

A method of controlling of two or more commutator DC motors with permanent magnets in driving mechanisms for setting a position of furniture parts such as hospital beds, tables, chairs consists in that there is periodically for a short period of time disconnected power supply of the motors, while in the time of disconnecting the supply is detected the voltage of each motor, best after the transient response on the motors' inductance goes off. This voltage, which is adequate to rotations and is not affected by internal resistance of the motor is adjusted by means of calibration constants, which are defined respectively for each particular motor and the direction of its rotation or, as the case may be, movement. From adjusted voltage values of each of the motors is determined a control deviation, which is used for power control of particular motors.

To extend the possibilities of motor regulation it is possible to introduce a reference voltage into the system, which the motors can easily go by to a defined movement speed.

Particular operations happen in a time sequence, where in the time T1 takes place a controlled motors' M run, in the time T2 are the motors M disconnected from the power supply and in the time T3, which can start delayed compared to T2 and which in doing so ends at the same time as T2, is measured voltage on motors M and then takes place measured values processing with determining the parameters for run of particular motors M in the following time T1 of the controlled motors' M run.

Figure 1:
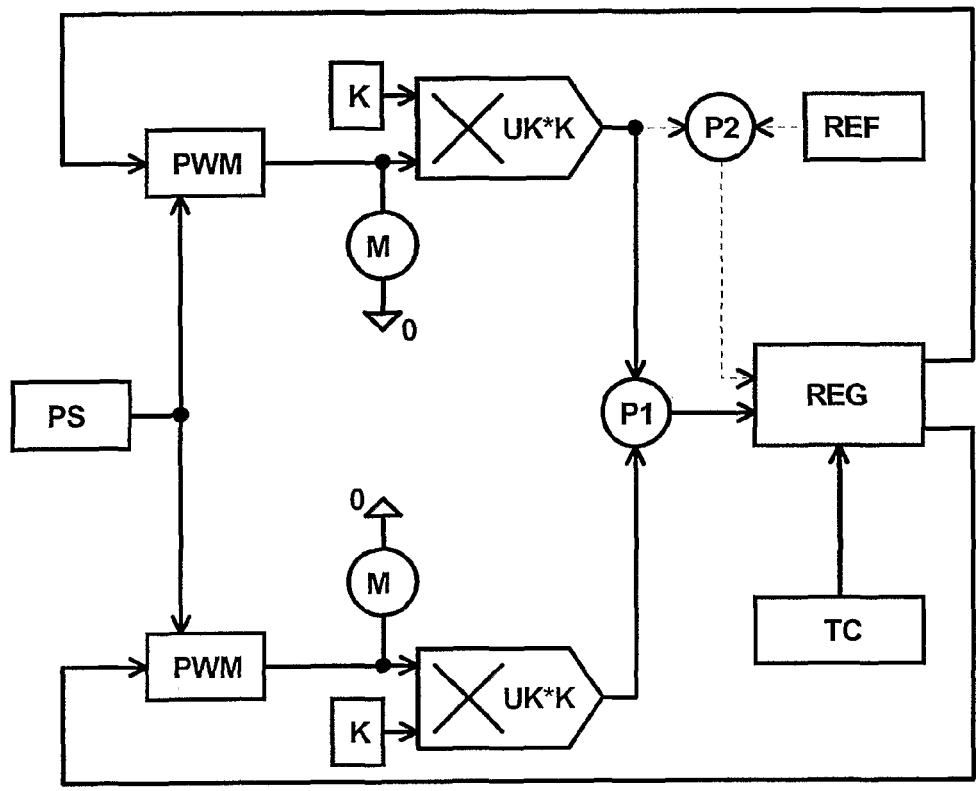
FIG. 1 represents a schematic diagram according to one example.
Figure 2:
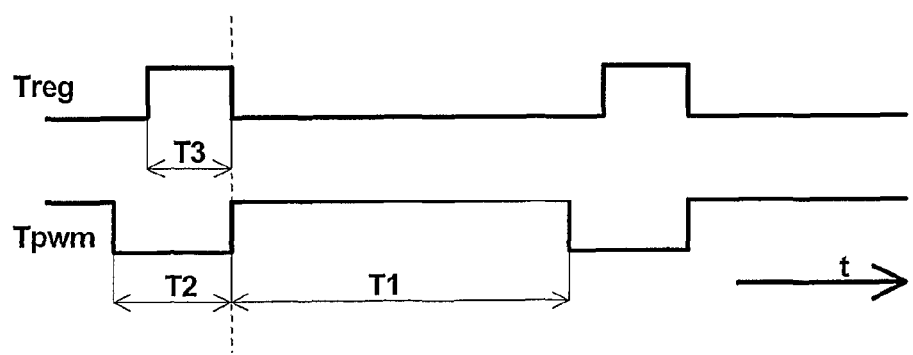
FIG. 2 represents time diagrams Treg and Tpwm of the block for timing the TC and FIG. 3 represents a schematic diagram according to another example.

In the example of embodiment shown in FIG. 1 a device for controlling two or more commutator DC permanent magnet motors in driving mechanisms for position setting of furniture parts at least one power supply PS, which is through power management blocks PWM for adjusting the power of particular motors connected with motors M. The power supply PS is direct current (main or battery powered). The voltage can be non-regulated and it can be filtered by thyristor condensers, while especially during load and main supply is present ripple. The power management block PWM for adjusting the power of particular motors regulates energy supplied into the particular motor M in the time T1 from FIG. 2, while it provides disconnecting motors M from the power supply. In particular can be used pulse width modulation, when there is the power supply PS periodically connected and disconnected from the motor M and the ratio between the time of connection and disconnection determines the magnitude of the supplied energy. During the time T2 from FIG. 2 is the output of the power management block PWM for adjusting the power of particular motors electrically disconnected from the motor M. The motor M is a DC reversible motor with permanent magnets in the stator and a rotor commutator.

To each motor M is by its first input connected a multiplier UK*K, to which second input is connected a calibration constant block K. Multiplier UK*K performs in the time of disconnecting the motor M from power supply a voltage measurement on the particular motor M and its multiplying by the calibration constant. The calibration constant is determined in the process of calibration for each motor M and both directions of rotation or, if you like, direction of movement. By means of multiplying by the calibration constant then electrically different motors M give on outputs of the multiplier UK*K same voltages at the same angular velocity. For exceptional cases of positioning, when we are regulating on purpose to various speed of the driving mechanisms, the calibration constant is selected according to these requirements. For evaluation is then advantageous to perform more measurements and further on work with the mean value.

The outputs of the multipliers UK*K are connected to the inputs of the first comparison element P1, whose outputs are connected to the first inputs of the regulator REG. On the output of the first comparison element P1 is the difference of the input voltages. If there are more than two motors M it is advantageous to find the slowest motor M and with the values measured on it compare the values measured on other motors M and regulate the speed of other motors M according to its speed.

The regulator REG processes the differential voltage from the outputs of the multipliers UK*K. In the case of regulation of more than two motors M, with each new motor M increases one output from the first comparison element P1 into the regulator REG. For the most common case of regulation of only two motors M is the output of the first comparison element P1 the only one. The regulator REG on the basis of the result from the first comparison element P1 increments the detected deviation to the summation of the deviations from last measurement cycles, which have a period T1+T2. While summation of the deviations it is necessary to respect the sign of the deviation. The regulator REG by its outputs connected to the power management block PWM for adjusting the power of particular motors regulates the power supplied to the motors M in the time T1 in such manner, that the summation of all control deviations over all periods of measurement was close to zero and in doing so there was slowed only the faster of the driving mechanisms.

To the second input of the regulator REG is by its output connected a timer clock TC. The timer clock TC defines the timing of particular operations in the device, in particular in the regulator REG. The main operations take place in the time T1, when the power management blocks PWM for adjusting the power of particular motors regulate the motors M. In the time T2 are the motors M disconnected from the power supply and in the time T3, which can start delayed compared to T2 and which ends at the same time as T2, is measured voltage on motors M and then takes place processing in the regulator REG, which determines setting the power for particular motors M in the following time T1 of the motors' M run. As the voltage value on the motors M and also as the result regulation deviation is appropriate to use the mean value from a number of measurements.

The outputs of the regulator REG are connected to the second inputs of the power management blocks PWM for adjusting the power of particular motors.

While expanding the device on constant-speed control of independent driving mechanisms or constant speed ratio control, the device is further fitted with a reference voltage block REF connected to the first input of the second comparison element P2, to which second input is connected the output of the selected multiplier UK*K. The reference voltage block REF is here represented only by the auxiliary reference voltage, determining the speed on which the regulator REG will control all motors M of the driving mechanisms in the control system. The output of the second comparison element P2 is connected to the third input of the regulator REG. Then when there is the need to control at lower or lower and in so doing constant speed independent on the power supply PS and on driving mechanisms load, all the blocks PWM control concurrently. The speed is then adjusted through the reference voltage block REF and the second comparison circuit P2 into the third regulator REG input.

Figure 3:
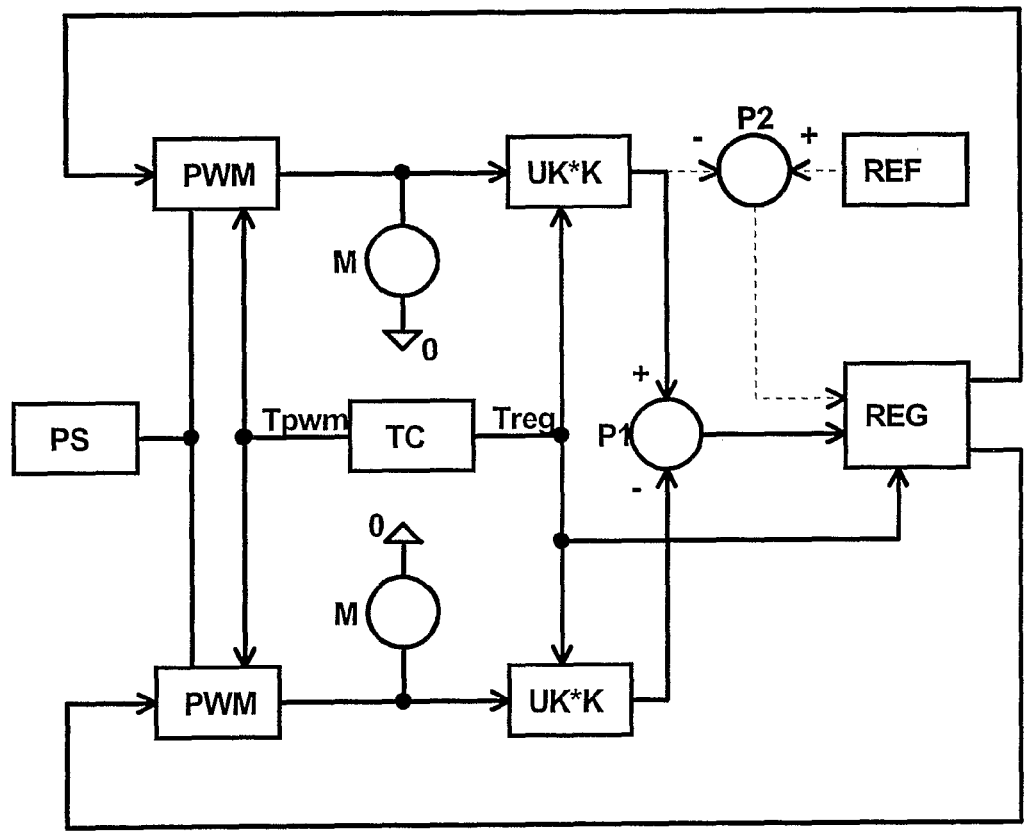

In the example of embodiment in FIG. 3 is the timer clock TC by its outputs connected not only to the regulator REG but also directly to the power management blocks PWM for adjusting the power of particular motors and to the multipliers UK*K, which enables even better function control of the entire device or if you like its particular members.

INDUSTRIAL APPLICABILITY

The invention is utilizable where there is a need for positioning by means of the driving mechanisms with commutator DC motors with permanent magnets, such as positioning beds, positioning tables, positioning chairs etc., in particular hospital beds, where particular driving mechanisms must maintain mutually approximately constant or defined speed independent on their different load and so doing at low expenses on driving mechanisms and also control unit.

The invention claimed is:

1. A method of controlling two or more commutator DC motors with permanent magnets in driving mechanisms for setting positions of furniture parts, where particular driving mechanisms maintain a mutually defined speed independently of different loads on the motors, the method comprising: during functioning of the motors, periodically disconnecting power supply to the motors, while during a time of disconnecting the power supply, detecting the voltage of each motor;
   adjusting the voltage of each motor using a calibration constant characteristic for each motor and a direction of rotation of each motor; and
   adjusting an operating mode of each motor according to differences of the adjusted voltages of particular motors, to reach regulation of a particular motor run at the mutually defined speed independently of the loads on the motors.

2. A method as claimed in claim 1, wherein after disconnecting the power supply, the voltage of each motor is detected after a transient response on the motors inductance goes off.

3. A method as claimed in claim 1, further comprising adjusting the operation mode of one of the motors by means of a reference voltage and according to the operation mode of the one of the motors, then determining the operation mode of the other motors.

4. A device for controlling two or more commutator DC motors with permanent magnets in driving mechanisms for setting positions of furniture parts, where particular driving mechanisms maintain a mutually defined speed independently of different loads on the motors, the device comprising:
   at least one power supply;
   power management blocks coupling the power supply with at least two particular motors of the DC motors, each motor having a first input and a second input;
   a multiplier coupled to the first input of each motor; each multiplier having at least one output
   a calibration constant block coupled to the second input of each motor;
   a first comparison element having inputs, the outputs of the multipliers being connected to the inputs of the first comparison element, the first comparison element further having outputs;
   a timer clock having an output; and
   a regulator having first inputs and a second input, the first inputs of the regulator being connected to the outputs of the power management blocks of the particular ones of the motors, and the second input of the regulator being connected to the output of the timer clock.

5. A device as claimed in claim 4, wherein the timer clock has further outputs, the power management blocks of the particular ones of the motors has inputs, and the multipliers have inputs, the further outputs of the timer clock being connected to the inputs of the power management blocks of the particular ones of the motors and to the inputs of the multipliers.

6. A device as claimed in claim 4, further comprising a second comparison element having inputs and an output, one of the regulator inputs being connected to the output of the second comparison element; the device further comprising a reference voltage block having inputs and an output, the inputs of the second comparison element being connected to the output of the reference voltage block and the reference voltage block inputs being connected to the output of one of the multipliers.

7. A method as claimed in claim 2, further comprising adjusting the operation mode of one of the motors by means of a reference voltage and then determined determining the operation mode of the other motors according to the operation mode of the one motor.

8. A device as claimed in claim 5, further comprising a second comparison element having inputs and an output, one of the regulator inputs being connected to the output of the second comparison element; the device further comprising a reference voltage block having inputs and an output, the inputs of the second comparison element being connected to the output of the reference voltage block and the reference voltage block inputs being connected to the output of one of the multipliers.

* * * * *